US011743532B2

(12) United States Patent
Shah et al.

(10) Patent No.: US 11,743,532 B2
(45) Date of Patent: Aug. 29, 2023

(54) LOCATION-TRACKED MEDIA DELIVERY ACROSS MULTIPLE MEDIA CONSUMPTION DEVICES

(71) Applicant: DISH Network L.L.C., Englewood, CO (US)

(72) Inventors: Rima Shah, Broomfield, CO (US); Swapnil Tilaye, Thornton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/214,571

(22) Filed: Mar. 26, 2021

(65) Prior Publication Data

US 2021/0219015 A1     Jul. 15, 2021

Related U.S. Application Data

(63) Continuation of application No. 16/178,590, filed on Nov. 2, 2018, now Pat. No. 10,986,398.

(51) Int. Cl.
*H04N 21/436*     (2011.01)
*H04N 21/258*     (2011.01)
(Continued)

(52) U.S. Cl.
CPC .. *H04N 21/43615* (2013.01); *H04N 21/25841* (2013.01); *H04N 21/41265* (2020.08);
(Continued)

(58) Field of Classification Search
CPC ....... H04N 21/43615; H04N 21/25841; H04N 21/4126; H04N 21/44227; H04N 21/6543
See application file for complete search history.

(56) References Cited

U.S. PATENT DOCUMENTS 9,148,280 B2    9/2015   Schultz
9,680,687 B2    6/2017   Chappelle et al.
(Continued)

FOREIGN PATENT DOCUMENTS

EP     2856804 A1    4/2015
GB     2483092 A     2/2012
(Continued)

*Primary Examiner* — Chenea Davis
(74) *Attorney, Agent, or Firm* — Kilpatrick Townsend & Stockton LLP

(57) ABSTRACT

Novel techniques are described for location-tracked media delivery. For example, a particular consumer premises has multiple media consumption devices, each located in a different room of the premises. One or more media streams being consumed via one or more of the media consumption devices can be tracked. As one or more consumers move through the premises, their respective physical locations in the premises can also be tracked with respect to media consumption regions of the media consumption devices. By detecting movement of the consumers with respect to the consumed streams and the media consumption devices, embodiments can automatically provide various features. For example, streams can automatically be transferred or cloned among the media consumption devices, and/or streams and devices can be adapted automatically to facilitate some continued media consumption in some dead space regions.

20 Claims, 5 Drawing Sheets

(51) Int. Cl.
*H04N 21/442* (2011.01)
*H04N 21/6543* (2011.01)
*H04N 21/41* (2011.01)

(52) U.S. Cl.
CPC . *H04N 21/44218* (2013.01); *H04N 21/44227* (2013.01); *H04N 21/6543* (2013.01)

(56) References Cited

U.S. PATENT DOCUMENTS

| | | |
|---|---|---|
| 10,986,398 B2 | 4/2021 | Shah et al. |
| 2007/0282990 A1 | 12/2007 | Kumar et al. |
| 2008/0031326 A1 | 2/2008 | Lecomte et al. |
| 2010/0058412 A1 | 3/2010 | Maisonneuve |
| 2013/0177154 A1 | 7/2013 | Hill-Jowett |
| 2014/0373039 A1 | 12/2014 | Davis et al. |
| 2015/0350590 A1* | 12/2015 | Micewicz ........ H04N 21/42201 386/230 |
| 2016/0044385 A1* | 2/2016 | Kareeson ........... G06Q 30/0241 725/27 |
| 2017/0208364 A1* | 7/2017 | Glazier ................ H04N 21/485 |
| 2018/0139071 A1* | 5/2018 | Onohara .......... H04N 21/43078 |

FOREIGN PATENT DOCUMENTS

| | | |
|---|---|---|
| KR | 101204493 A | 8/2012 |
| WO | 2008094377 A1 | 8/2008 |

* cited by examiner

LOCATION-TRACKED MEDIA DELIVERY ACROSS MULTIPLE MEDIA CONSUMPTION DEVICES

CROSS-REFERENCE TO RELATED APPLICATION

This patent application is a continuation of U.S. application Ser. No. 16/178,590, filed Nov. 2, 2018. The foregoing application is herein incorporated by reference in its entirety for all purposes.

BACKGROUND OF THE INVENTION

Television users and other audiovisual media consumers have become accustomed to increased flexibility when consuming media, such as by having access to hundreds of channels, advanced program guides, on-demand programming, digital video recording and storage, and other features that provide viewing flexibility. However, when a user begins consuming such media on a particular non-portable device (e.g., a television), the user typically must remain within a limited area to continue consuming the media on that device. Otherwise, if the user moves to a different location, such as a different room of a house, the user typically must find a new device in the new location and configure the new device to continue delivering the same media (e.g., by tuning to the same channel as on the previous device, logging onto a subscription service and resuming playback, etc.).

Such configuring can often be frustrating. For example, with broadcast media, or the like, the user may miss portions of the media being broadcast while the user is changing locations and configuring the new device. With subscription streaming media, the configuring may involve logging into a subscription service on the new device, locating the desired media again, and resuming playback; all appreciably interrupting the consumption experience. These and other frustrations can be exacerbated when multiple people are jointly consuming media, and fewer than all the people change location.

BRIEF SUMMARY

Among other things, embodiments provide novel systems and methods for location-tracked media delivery. For example, a particular consumer premises (e.g., a house) has multiple media consumption devices, each located in a different room of the premises. One or more media streams being consumed via one or more of the media consumption devices can be tracked. As one or more consumers move through the premises, their respective physical locations in the premises can also be tracked with respect to media consumption regions of the media consumption devices. By detecting movement of the consumers with respect to the consumed streams and the media consumption devices, embodiments can automatically provide various features. For example, streams can automatically be transferred or cloned among the media consumption devices, and/or streams and devices can be adapted automatically to facilitate some continued media consumption in some dead space regions.

According to one set of embodiments, a location-tracked media delivery system is provided. The system includes: a consumer location tracking subsystem to generate consumer tracking data responsive to dynamically tracking a respective physical location for each of a plurality of consumers; a device data store having stored thereon device parameter data indicating, for each media consumption device (MCD) of a plurality of MCDs, a respective media consumption region within which media is user-consumable via the MCD; and a media stream tracking subsystem, coupled with the device data store and the consumer location tracking subsystem. The media stream tracking subsystem is to: detect, at a first time, a first location-tracked consumption condition indicating present playback of a media stream by a first MCD of the plurality of MCDs, and indicating concurrent consumption of the media stream by first and second consumers of the plurality of consumers via the first MCD in accordance with the consumer tracking data and the device parameter data indicating that the respective physical locations of the first and second consumers are within the respective media consumption region of the first MCD; detect, at a second time, a relocation trigger responsive to movement of the respective physical location of the first consumer from within the respective media consumption region of the first MCD to within the respective media consumption region of a second MCD of the plurality of MCDs; detect, responsive to the relocation trigger, a second location-tracked consumption condition indicating continued playback of the media stream by the first MCD, and indicating continued consumption of the media stream by the second consumer via the first MCD in accordance with the consumer tracking data and the device parameter data indicating that the respective physical location of the second consumer is within the respective media consumption region of the first MCD; and direct, responsive to the relocation trigger and the second location-tracked consumption condition, concurrent playback of the media stream via the first MCD and the second MCD.

According to another set of embodiments, a method is provided for location-tracked media delivery. The method incudes: detecting, at a first time, a first location-tracked consumption condition indicating present playback of a media stream by a first media consumption device (MCD) of a plurality of MCDs, and indicating concurrent consumption of the media stream by first and second consumers of a plurality of consumers via the first MCD in accordance with consumer tracking data and device parameter data indicating that respective physical locations of the first and second consumers are within a respective media consumption region of the first MCD; detecting, at a second time, a relocation trigger responsive to movement of the respective physical location of the first consumer from within the respective media consumption region of the first MCD to within a respective media consumption region of a second MCD of the plurality of MCDs; detecting, responsive to the relocation trigger, a second location-tracked consumption condition indicating continued playback of the media stream by the first MCD, and indicating continued consumption of the media stream by the second consumer via the first MCD in accordance with the consumer tracking data and the device parameter data indicating that the respective physical location of the second consumer is within the respective media consumption region of the first MCD; and directing, automatically in response to the relocation trigger and the second location-tracked consumption condition, concurrent playback of the media stream via the first MCD and the second MCD.

According to another set of embodiments, another location-tracked media delivery system is provided. The system includes one or more processors, and a memory communicatively coupled with, and readable by, the one or more processors and having stored therein processor-readable instructions which, when executed by the one or more processors, cause the one or more processors to perform steps. The steps include to: detect, at a first time, a first location-tracked consumption condition indicating present playback of a media stream by a first media consumption device (MCD) of a plurality of MCDs, and indicating concurrent consumption of the media stream by first and second consumers of a plurality of consumers via the first MCD in accordance with consumer tracking data and device parameter data indicating that respective physical locations of the first and second consumers are within a respective media consumption region of the first MCD; detect, at a second time, a relocation trigger responsive to movement of the respective physical location of the first consumer from within the respective media consumption region of the first MCD to within a respective media consumption region of a second MCD of the plurality of MCDs; detect, responsive to the relocation trigger, a second location-tracked consumption condition indicating continued playback of the media stream by the first MCD, and indicating continued consumption of the media stream by the second consumer via the first MCD in accordance with the consumer tracking data and the device parameter data indicating that the respective physical location of the second consumer is within the respective media consumption region of the first MCD; and direct, automatically in response to the relocation trigger and the second location-tracked consumption condition, concurrent playback of the media stream via the first MCD and the second MCD.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
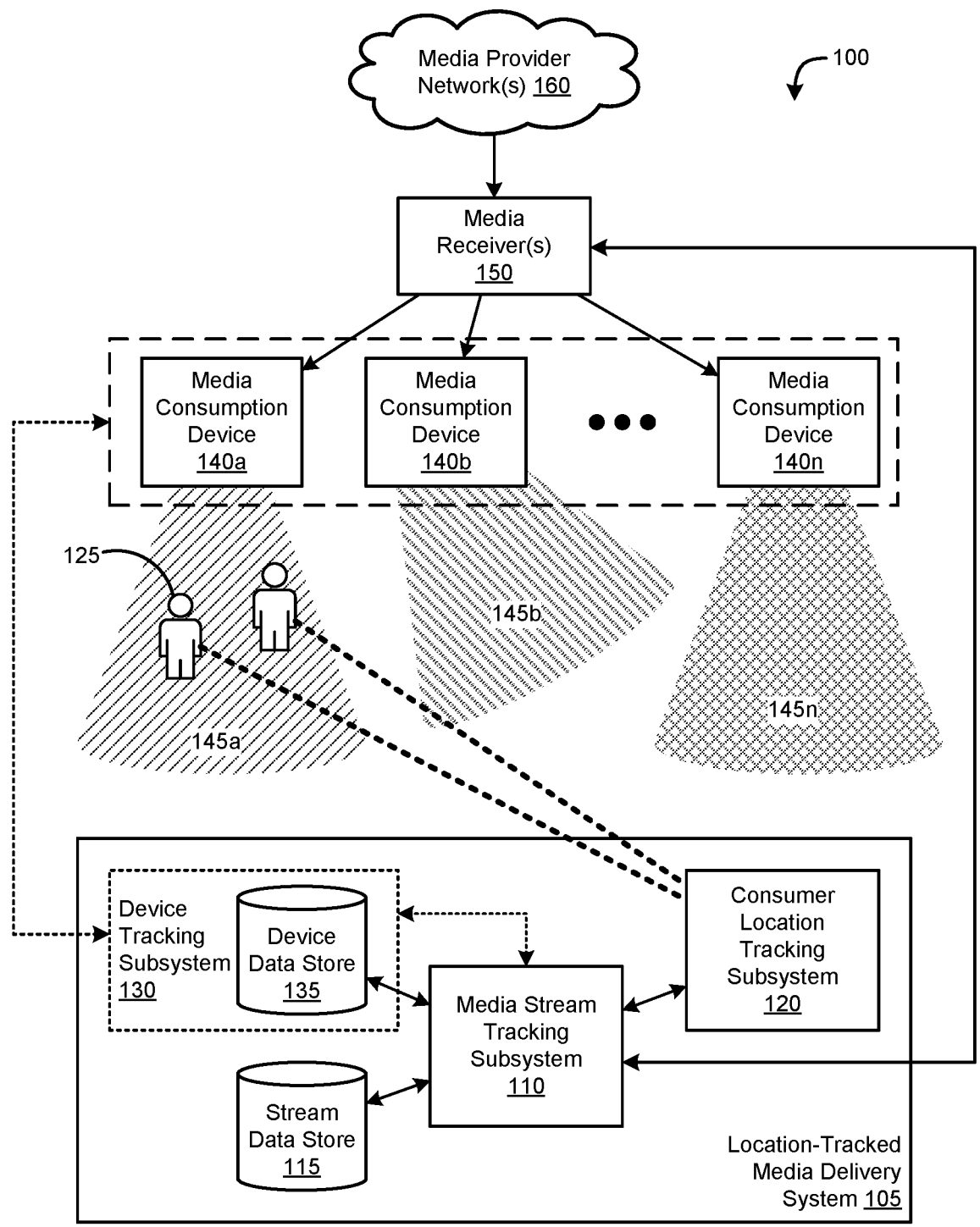
FIG. 1 shows an illustrative location-tracked media delivery environment, as a context for various embodiments.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

People often consume media using media consumption devices having a substantially fixed location (e.g., devices not intended to be mobile devices). For example, a television can be placed in a particular location in a room (e.g., mounted on a wall, placed on a table or shelf, etc.), where it can be plugged into an outlet and connected to a television receiver and/or network. Placement of the device, and/or other characteristics of the device (e.g., the screen size, viewing angle, etc.) can effectively define a spatial area over which an individual can consume programming via the device; referred to herein as a "media consumption region" of the device. An individual standing or sitting outside the media consumption region may be unable to consume the programming as desired, for example, because the individual may be too far away to hear and/or see the device, viewing of the device may be occluded by one or more objects, the individual may be in a different room than the device, etc.

Accordingly, when the individual begins consuming the programming via the device, the user typically must remain within the media consumption region of the device to continue consuming the programming. If the individual moves to a different location that is outside the media consumption region of the device, the user's consumption of the programming is typically interrupted. In some cases, the individual can move into the media consumption region of a new device, and configure the new device to continue delivering the same programming (e.g., by tuning to the same channel as on the previous device, logging onto a subscription service and resuming playback, etc.). However, such configuring of a new device can often be frustrating. As one example, with broadcast media, or the like, the individual may miss portions of the programming being broadcast while changing locations and configuring the new device. As another example, with subscription streaming media, the configuring may involve logging into a subscription service on the new device (if the service is available on the new device), locating the desired media again, and resuming playback; all appreciably interrupting the consumption experience.

Limited conventional approaches exist for addressing such frustrations. For example, some such conventional approaches allow an individual to manually transfer playback of programming from one device to another device on a local network in a relatively seamless fashion, such as by using an interface on a set-top box, remote control, portable device, etc. However, such conventional approaches tend to have a number of limitations. One limitation is that such conventional approaches often rely on the individual user to manually transfer playback of the programming from one device to another, which can often be cumbersome (e.g., when the interface is limited, different devices are difficult for individuals to distinguish via the interface, the individual is quickly called to a new location, etc.). Another limitation is that such conventional approaches tend not to address "dead space regions" between the consumption regions of the multiple devices. Another limitation is that such conventional approaches tend not to work well with multiple individuals desiring paired consumption experiences, when those individuals may change between being collocated at some times and not collocated at other times during the consumption of the programming.

Embodiments described herein include novel approaches to location-tracked media delivery. For example, a particular consumer premises (e.g., a house) has multiple media consumption devices, each located in a different room of the premises. One or more media streams being consumed via one or more of the media consumption devices can be tracked. As one or more consumers move through the premises, their respective physical locations in the premises can also be tracked with respect to media consumption regions of the media consumption devices. By detecting movement of the consumers with respect to the consumed streams and the media consumption devices, embodiments can automatically provide various features. For example, streams can automatically be transferred or cloned among the media consumption devices, and/or streams and devices can be adapted automatically to facilitate some continued media consumption in some dead space regions.

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

FIG. 1 shows an illustrative location-tracked media delivery environment 100, as a context for various embodiments. In some embodiments, the environment 100 is a consumer premises, such as a house. The environment 100 includes a number of media consumption devices (MCDs) 140 in communication with one or more media provider networks 160 via one or more media receivers 150. The environment also includes a location-tracked media delivery system 105. The location-tracked media delivery system 105 includes at least a media stream tracking subsystem 110 and a consumer location tracking subsystem 120.

MCDs 140 can include any suitable type of device via which users (referred to herein as consumers 125) can consume audio and/or visual media, such as a television, desktop or laptop computer, smart phone, etc. Though not explicitly shown, it is assumed that at least some of the MCDs 140 are located in substantially fixed locations within a premises, such as in rooms of a house. For example, while a typical television set can be moved, it is generally considered as being in a fixed location, at least during a particular time window of interest. As used herein, phrases, such as "fixed location," are generally used in reference to an intended interaction involving one or more consumers 125. For example, if a consumer 125 would tend to move to the location of the MCD 140 to consume media via the MCD 140, rather than carrying around the MCD 140 (or otherwise tending to move the MCD 140 to a desired location for consuming media), the MCD 140 is considered herein to have a fixed location.

In some embodiments, the location-tracked media delivery system 105 includes, or is in communication with, a device data store 135. The device data store 135 can have stored thereon device parameter data indicating, for each MCD 140 a respective media consumption region 145 within which media is user-consumable via the MCD 140. Placement of a particular MCD 140, and/or other characteristics of the MCD 140 (e.g., the screen size, viewing angle, etc.) can effectively define a spatial area over which an individual can consume programming via the device, which is referred to herein as the media consumption region 145 of the MCD 140. While the media consumption region 145 of a particular MCD 140 can change over time (e.g., by changing the orientation of the MCD 140, adjusting the brightness or volume, removing occlusions, etc.), the media consumption region 145 of any particular MCD 140 can be defined by a substantially fixed region, at least during a particular time window of interest. As with the phrase "fixed location," phrases, such as "fixed region," are generally used in reference to an intended interaction involving one or more consumers 125. For example, at any particular time, the geographic region over which consumers 125 would tend to find it desirable to consume media via a particular MCD 140 can be considered as the fixed region defining the media consumption region 145 of the MCD 140.

Figure 2A:
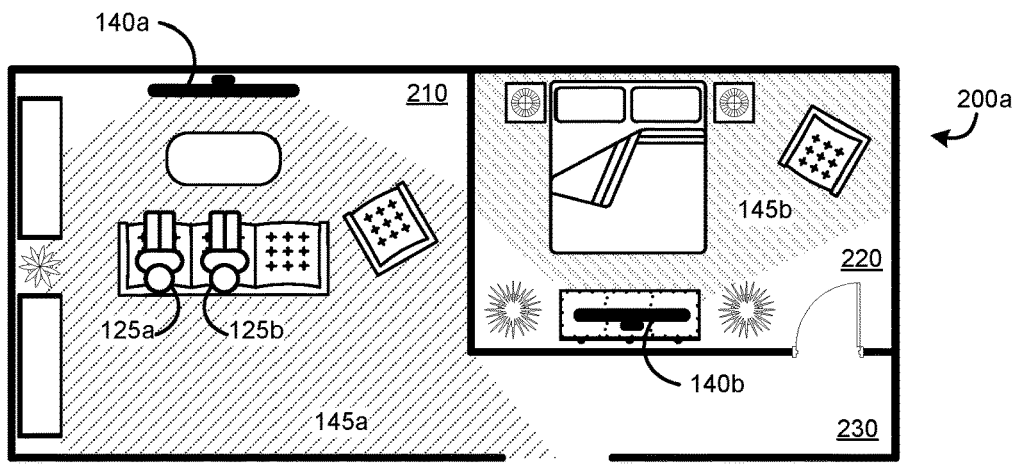
FIGS. 2A-2C show partial top views of an illustrative consumer premises, according to various embodiments.
Figure 2B:
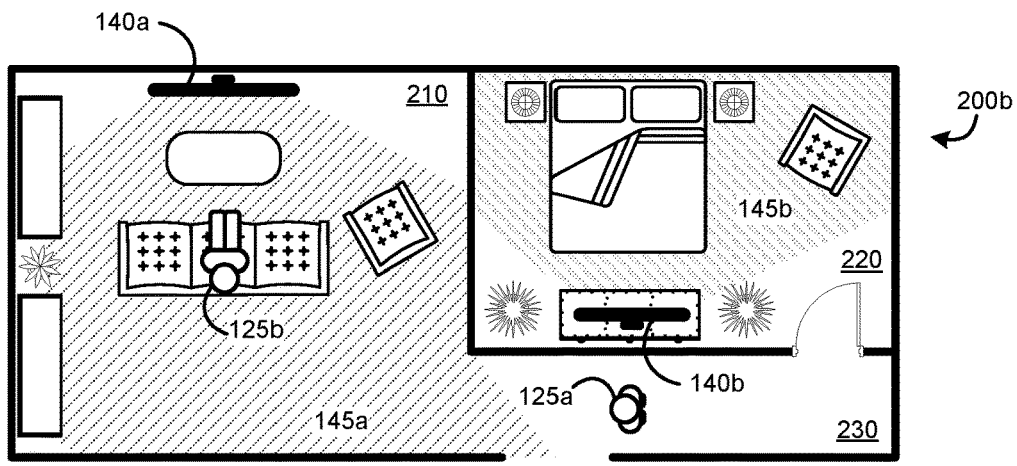
Figure 2C:
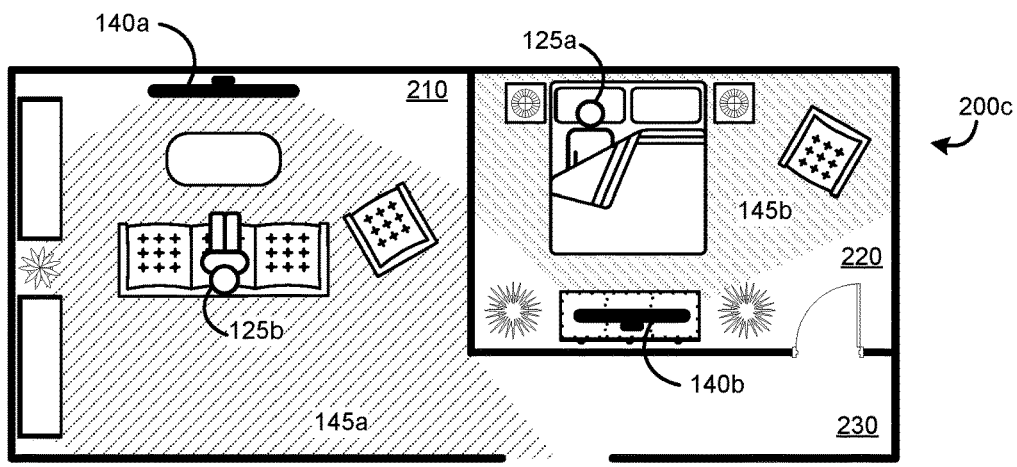

For the sake of illustration, FIGS. 2A-2C show partial top views of an illustrative consumer premises 200, according to various embodiments. The consumer premises 200 includes a living room 210, a bedroom 220, and a hallway 230. In FIG. 2A, two consumers 125 are sitting on a couch within a media consumption region 145a of a first MCD 140a (e.g., a first television). The media consumption region 145a is particularly defined for the first MCD 140a. The media consumption region 145a is illustrated as taking up most, but not all, of the area of the living room 210. For example, the first MCD 140a has a display screen with a particular viewing angle, and the living room 210 has various occlusions (e.g., tall bookshelves), all of which interfering with a consumer's 125 ability to consume media (e.g., watch television) via the first MCD 140a. The media consumption region 145a of the first MCD 140a is illustrated as also including a portion of the hallway 230 from which the first MCD 140a is visible by a consumer 125.

In some implementations, different media consumption regions 145 can be defined for the same MCD 140 with reference to particular types of media. For example, the illustrated media consumption region 145a assumes that the desired media consumption via the MCD 140a is television viewing. However, if the MCD 140a is being used to consume audio-only media (e.g., music, podcasts, etc.), the media consumption region 145a may completely fill the area of the living room 210 and a larger portion of the hallway 230. In some implementations, one or more media consumption regions 145 can be parametrically defined according to one or more variable. For example, a media consumption region 145 defined with respect to audio media consumption can be different for different volume settings.

FIG. 2B illustrates a case in which a first of the consumers 125a has left the living room 210 and has entered the hallway 230, and a second of the consumers 125b has remained in the living room 210. In the illustrated case, the second consumer 125b is still within the media consumption region 145a of a first MCD 140a, but the first consumer 125a is now outside the media consumption region 145a of a first MCD 140a. In fact, the first consumer 125a is now in a dead space region, a region outside the media consumption region 145 of all MCDs 140 of the consumer premises 200. FIG. 2C illustrates a case in which the first of the consumers 125a is now in the bedroom 220, while the second of the consumers 125b has continued to remain in the living room 210. In the illustrated case, the second consumer 125b is still within the media consumption region 145a of a first MCD 140a, and the first consumer 125a is now within a media consumption region 145b of a second MCD 140b (e.g., another television).

Returning to FIG. 1, some embodiments of the location-tracked media delivery system 105 include a device tracking subsystem 130. In some implementations, the device tracking subsystem 130 includes the device data store 135 to store device data for the MCDs 140. The device tracking subsystem 130 can communicate with one or more (e.g., all) of the MCDs 140 (and/or with the media receiver(s) 150). In some embodiments, the device tracking subsystem 130 includes a database (e.g., stored in the device data store 135) of the MCDs 140 and their respective media consumption regions 145. In other embodiments, the device tracking subsystem 130 includes one or more sensors to track locations of MCDs 140 and/or to determine media consumption regions 145. In still other embodiments, the device tracking subsystem 130 can detect certain operating parameters of one or more of the MCDs 140, such as what media or media types are currently being delivered via the MCDs 140 (e.g., media title; media genre; whether the media is audio only, video only, or audio-visual; etc.), media playback settings of the MCDs 140 (e.g., current volume settings, brightness settings, display aspect ratios, etc.), interface status information for the MCDs 140 (e.g., to which channel tuners are currently tuned, present network congestion, etc.), etc. In still other embodiments, the device tracking subsystem 130 can be used automatically to direct operation of one or more MCDs 140. For example, the device tracking subsystem 130 can automatically turn on an MCD 140, tune the MCD 140 to a particular channel, set the volume of the MCD 140, etc. In some cases, the MCD 140 can include motorized orientation control, and some embodiments of the device tracking subsystem 130 can operate automatically to adjust the motorized orientation control (e.g., to automatically tilt or turn a display screen, to automatically open a cabinet in which the MCD 140 is disposed, etc.).

In some embodiments, the location-tracked media delivery system 105 includes a consumer location tracking subsystem 120. Embodiments of the consumer location tracking subsystem 120 can generate consumer tracking data responsive to dynamically tracking a respective physical location for each of multiple consumers 125. The consumer tracking can be implemented in any suitable manner. In some implementations, one or more consumers 125 has on his or her person (e.g., is wearing, carrying, has affixed to clothing, etc.) a device that is trackable by the consumer location tracking subsystem 120. For example, one or more consumers 125 is wearing or carrying a smart phone, a smart watch, or any other suitable wearable or portable device. The device can be tracked in any suitable manner. In one implementation, the device knows its own location and can communicate the location to the consumer location tracking subsystem 120 periodically, in response to a location request by the consumer location tracking subsystem 120, etc. In another implementation, consumer location tracking subsystem 120 includes one or more sensors (e.g., RF communication devices) that can detect a signal strength and/or other information which can be used (e.g., triangulated) to obtain a location of the device, and thereby a physical location of the consumer 125. In other implementations, the consumer location tracking subsystem 120 includes one or more cameras to visually detect locations of one or more consumers 125 (e.g., by acquiring video data of one or more regions of the premises and processing the video to look for signatures that indicate a consumer 125). In other implementations, motion sensors, or the like can be used to detect and record motion data throughout regions of a premises, which can be used to build a model of the locations of one or more consumers 125.

The location tracking can be performed at any suitable frequency (e.g., continuously, periodically, etc.). The location tracking can also be performed at any suitable resolution; features of various embodiments described herein can be realized in some cases with only approximate location information for consumers 125. For example, referring to FIG. 2C, a motion detector can be placed at the doorway (or in another location) of the bedroom 220, and it can be sufficient in some cases to determine the physical location of the first consumer 125a only by detecting that some consumer 125 is presently in the bedroom 220 (e.g., it can be assumed, in some cases, that the media consumption region 145b of the second MCD 140b is effectively the entire bedroom 220).

In some embodiments, the consumer location tracking subsystem 120 generates consumer tracking data that indicates physical locations, but does not associate those physical locations with any particular one of multiple consumers 125. For example, the consumer location tracking subsystem 120 can generate consumer tracking data indicating that, at some particular time, one consumer 125 is in one physical location, and another consumer 125 is in another physical location. In such an embodiment, if the consumers 125 were subsequently to switch places, the consumer tracking data may look the same. In other embodiments, the consumer location tracking subsystem 120 generates consumer tracking data that indicates physical locations for each of multiple consumers 125 and maintains tracking for each of the multiple consumers 125; but each consumer 125 is treated generically. For example, the consumer tracking data can indicate that, at some particular time, a first consumer 125 is in a first physical location, and a second consumer 125 is in a second physical location. In such an embodiment, if the consumers 125 were subsequently to switch places, such would be indicated by the consumer tracking data. In still other embodiments, the consumer location tracking subsystem 120 generates consumer tracking data that indicates physical locations for each of multiple consumers 125 and maintains tracking for each of the multiple consumers 125; and the data also uniquely identifies each of at least some of the consumers 125 as associated with a particular profile. For example, the consumer tracking data can indicate that, at some particular time, a first consumer 125 identified as Bob is in a first physical location, and a second consumer 125 identified as Sally is in a second physical location. In such an embodiment, if Bob and Sally were to switch places, such would be indicated by the consumer tracking data.

Unique identification of a particular consumer 125 can be performed in any suitable manner. For example, in implementations of the consumer location tracking subsystem 120 having one or more cameras, image recognition algorithms (e.g., facial detection, body measurement data, etc.) can be used to match detected consumers 125 to a database of consumer profiles, or the like. As another example, in implementations of the consumer location tracking subsystem 120 configured to track wearable, or otherwise portable, devices of consumers 125, communications with the devices can include receiving identifiers of the devices, and the identifiers can be compared with a stored set of profiles to determine whether the identifiers match stored data of any particular consumers 125.

Embodiments of the location-tracked media delivery system 105 include a media stream tracking subsystem 110, which can be coupled with (e.g., integrated with, in communication with, coupled directly to, etc.) the device data store 135 and/or the consumer location tracking subsystem 120. Embodiments of the media stream tracking subsystem 110 can track and direct playback of media streams to the consumers 125 via the MCDs 140 in accordance with detected location-tracked consumption conditions, which can be stored in a stream data store 115. The location-tracked consumption conditions can be based on device data for the MCDs 140 (from the device data store 135 and/or the device tracking subsystem 130) and consumer tracking data for the consumers 125 (from the consumer location tracking subsystem 120). The media stream tracking subsystem 110 can monitor which media streams are presently being played back via which MCDs 140. In some implementations, the media stream tracking subsystem 110 can further track certain media stream parameters for those media streams, such as whether those media streams are audio only, video only or audiovisual streams; whether those streams have particular characteristics that would impact consumption by consumers 125 (e.g., a very low-contrast video, or music having a large dynamic range may impact what is considered to be the media consumption region 145 for a MCD 140 playing that media stream); etc.

In some cases, the media stream tracking subsystem 110 can monitor whether one or more coupling parameters of a media stream. The coupling parameters can indicate how the media stream should be treated in context of multiple consumers 125, and can be set by default, configured by consumers 125, set automatically by media content producers, set by machine learning algorithms in accordance with viewing behaviors of one or more consumers 125, or set in any suitable manner. The coupling parameters can be used by the media stream tracking subsystem 110 to determine whether a particular media stream should automatically follow a particular consumer 125. The coupling parameters can be associated with consumers 120 and/or streams in any suitable manner. For example, each media stream can be associated in the stream data store 115 with one or more tracking tags (e.g., one or more bits that indicate the coupling parameters). Additionally or alternatively, the streams can include metadata (e.g., stored in the stream data store 115) that indicate coupling parameters and/or other suitable information.

For example, in context of the example illustrated by FIGS. 2A-2C, suppose a first exemplary case, in which the coupling parameters for the media stream being played back via the first MCD 140*a* indicates that the media stream is coupled with respect to all consumers 120. In this first exemplary case, when either or both of the consumers 120 leaves the living room 210 and/or enters the bedroom 220, the media stream tracking subsystem 110 can automatically turn on the second MCD 140*b* and clone the media stream to the second MCD 140*b* (e.g. by tuning the second MCD 140*b* to the same channel as that of the first MCD 140*a*, by generating a second stream of the same media that is synchronized with the first stream, by establishing a multicast of the media stream and subscribing the first and second MCDs 140 to the multicast stream, etc.). Suppose a second exemplary case, in which the coupling parameters for the media stream being played back via the first MCD 140*a* indicates that the media stream is coupled with respect to the first consumer 120*a*, and not with respect to the second consumer 120*b*. In this second exemplary case, when the first consumer 120*a* leaves the living room 210 and/or enters the bedroom 220, the media stream tracking subsystem 110 can operate as in the first exemplary case. However, when the second consumer 120*b* leaves the living room 210 and/or enters the bedroom 220, one implementation of the media stream tracking subsystem 110 can effectively ignore the change in condition with respect to the media stream. Another implementation of the media stream tracking subsystem 110 can automatically generate a prompt to permit opting in or out of automatic coupling. For example, as the second consumer 120*b* leaves the media consumption region 145 of the first MCD 140*a*, the media stream tracking subsystem 110 can push a notification to a personal mobile device of the second consumer 120*b* (e.g., a smart watch, smart phone, etc.), such as "Press this button, if you want the show you are watching to follow you." If the second consumer 120*b* presses the button (e.g., a physical or virtual button on the user interface of the personal mobile device), the stream coupling parameters can be updated to indicate coupling for the second consumer 120*b*. In other exemplary cases, coupling parameters can indicate behavior by consumer 120 (e.g., how to treat all media streams with respect to each consumer 120), by stream (e.g., how to treat all consumers 120 with respect to each stream), by stream by consumer (e.g., how to treat each stream with respect to each consumer 120), or in any other suitable manner.

In some embodiments, coupling parameters can include additional indications of coupling behavior. In some such embodiments, coupling parameters can indicate whether to maintain synchrony of viewing among multiple viewers under certain conditions. As one example, when a consumer 125 enters a new media consumption region 145 after passing through a dead space region, one implementation continues the consumer's consumption (or prompt for the option to do so) in the new media consumption region 145 from a synchronized point (i.e., the same point at which the media stream continues to be playing back via the MCD 140 in the previous media consumption region 145); another implementation continues the consumer's consumption (or prompt for the option to do so) in the new media consumption region 145 from a point at which the consumer 120 left the previous media consumption region 145 (i.e., so that the consumer 125 does not miss any of the media stream, despite any resulting lack of absolute synchrony between the streams viewable in the previous and new media consumption regions 145); and another implementation pauses playback of the media stream in the previous media consumption region 145 until playback commences in the new media consumption region 145 (i.e., forcing synchrony, despite any impact on the viewing experience of consumers 120 in the previous media consumption region 145). In some implementations, the coupling parameters may or may not permit navigation control by one or more consumers 120 (e.g., rewind, fast forward, pause, etc.), may or may not define a stream master (e.g., one consumer or MCD 140 that can provide and/or interface with navigation controls, while others cannot), may or may not force synchrony during navigation control (e.g., when one consumer 120 pauses on one MCD 140, all MCDs 140 playing the media stream also pause), etc.

In some embodiments, a coupling interface can be provided (e.g., displayed on the MCDs 140, on a consumer's 120 personal mobile device, etc.) that permits certain monitoring and/or control of stream coupling. For example, in some embodiments that permit a lack of synchrony, the interface can indicate which portion of the stream is presently being played back via other MCDs 140 (e.g., as a picture-in-picture display, as an elapsed time bar, etc.). Other embodiments of the interface can, for example, indicate whether a particular stream is set for coupling, permit consumers 120 to set whether a particular stream is coupled, etc.

In some embodiments, the media stream tracking subsystem 110 can include various features to handle media consumption experience in dead space regions. One category of such features involves monitoring and controlling of certain types of smart mobile devices and/or Internet of things (IoT) appliances. Various types of mobile media playback devices (e.g., smart phones, smart watches, tablet computers, etc.) can display some or all of the media stream content being displayed by the MCDs 140. In some implementations, the device tracking subsystem 130 can detect the presence of such a device moving through a dead space region along with a consumer 120; and the device tracking subsystem 130 (or the media stream tracking subsystem 110 via the device tracking subsystem 130) can direct the detected mobile device to display the media stream at least while the consumer 120 is in a dead space region. In other implementations, one or more mobile or fixed devices can be directed to provide some of the media stream content. For example, which a consumer 120 is in a dead space region, the consumer 120 can be carrying one or more mobile media playback devices, and/or one or more smart home appliances (e.g., IoT appliances with media playback capability) can be disposed in the dead space region. The device tracking subsystem 130 can detect the presence of such devices and can (e.g., alone, or directed by the media stream tracking subsystem 110) direct one or more of the detected devices to provide the portion of the media stream content it is capable to provide at least while the consumer 120 is in a dead space region. As one example, as a consumer 120 moves through a dead space region between two televisions displaying an audiovisual media stream, a holographic display device can continue playback of the audiovisual media stream in the dead space region (e.g., the holographic display device can be disposed in the dead space region as part of a fixed media playback device, such as a holographic projection system mounted in or near the dead space region; as part of a consumer 120 mobile media playback device, such as a holographic projector built into a smart watch; etc.). As another example, as a consumer 120 moves through a dead space region between two televisions displaying an audiovisual media stream, an IoT audio device can be directed to play the audio portion of the audiovisual media stream.

Another category can involve effectively adjusting the media consumption region 145 for one or more MCDs 140 with respect to some or all of the media stream content. In some implementations, effectively adjusting the media consumption region 145 can involve automatically moving or reorienting one or more MCDs 140 to effectively change the media consumption region 145 (e.g., automatically turning a television to point down a hallway, or the like). In other implementations, effectively adjusting the media consumption region 145 can involve adjusting the volume and/or other playback parameters of the media stream. For example, as a consumer 125 leaves the media consumption region 145 of a first MCD 140 and approaches the media consumption region 145 of a second MCD 140, respective volumes of one or both MCDs 140 can automatically adjust (e.g., the volume of the first MCD 140 will automatically increase to a point and for a time as the consumer 120 gets further from its media consumption region 145, and/or the volume of the second MCD 140 will automatically decrease to a point and for a time as the consumer 120 gets closer to its media consumption region 145). Such automatic adjustments can minimize the loss of consumption experienced by the consumer 120 while the consumer 120 is passing through dead space regions.

Figure 3:
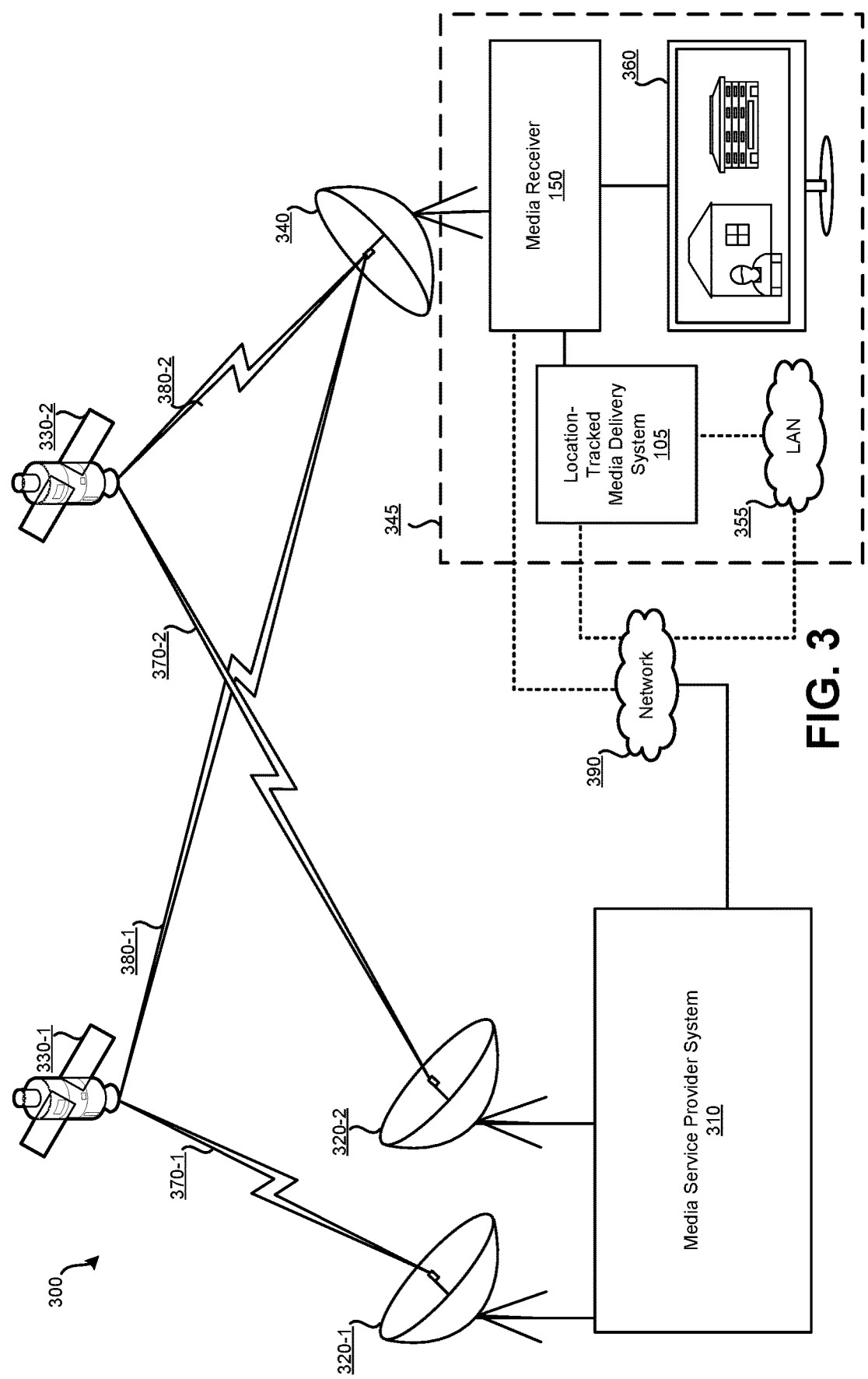
FIG. 3 shows an illustrative satellite television distribution system as context for various embodiments described herein.

The location-tracked media delivery environment 100 can be implemented in any suitable context involving any suitable type of communications networks, architectures, etc. FIG. 3 shows an illustrative satellite television distribution system 300 as context for various embodiments described herein. Satellite television distribution system 300 may include: television service provider system 310, satellite transmitter equipment 320, satellites 330, satellite dish 340, television receiver 350, and display device 360. Display device 360 can represent an instance of MCDs 140, described herein. Alternate embodiments of satellite television distribution system 300 may include fewer or greater numbers of components. While only one satellite dish 340, television receiver 350, and display device 360 (collectively referred to as "user equipment") are illustrated, it should be understood that multiple (e.g., tens, thousands, millions) instances of user equipment may receive television signals from television service provider system 310 via satellites 330. Further, while embodiments are described in particular context of a satellite television distribution system 300, techniques described herein can also be implemented in context of other television and media distribution architectures and infrastructures, such as cable television distribution networks.

The user equipment is shown disposed at a subscriber premises 345. The subscriber premises 345 can be a subscriber's home, office, or any suitable location associated with a particular subscriber at which to locate the subscriber's satellite dish 340 and television receiver 350. As one example, the satellite dish 340 is mounted to an exterior location (e.g., wall, roof, etc.) of the subscriber's home, and cables run from the satellite dish 340 to the television receiver 350, which is located inside the subscriber's home; and one or more display devices 360 (e.g., televisions) is coupled with the television receiver 350 and located in the subscriber's home.

Embodiments include a location-tracked media delivery system 105, such as described with reference to FIGS. 1 and 2. Though not explicitly shown, the location-tracked media delivery system 105 can include some or all of a media stream tracking subsystem 110, a consumer location tracking subsystem 120, a device tracking subsystem 130, a stream data store 115, and a device data store 135. In some embodiments, certain features of the location-tracked media delivery system 105 exploit other user equipment in the subscriber's premises 345. As illustrated, the user equipment can include components for establishing a local area network (LAN) 355 (e.g., a home IoT network), which can be in communication with the network 390. Though not shown, the LAN 355 can be in communication with various types of devices, such as with components of the location-tracked media delivery system 105, with one or more MCDs 140, and/or with one or more IoT devices. Implementation of the LAN 355 can involve any suitable routers, switches, modems, wireless transceivers, wired ports, and/or other network devices; and though described as a "LAN," the LAN 355 can be implemented as any suitable local network, such as a wide-area network (WAN), a home-area network (HAN), a wireless local-area network (WLAN), etc. The LAN router 355 can be in communication with user equipment using a wired or wireless communications link.

Television service provider system 310 and satellite transmitter equipment 320 may be operated by a television service provider. A television service provider may distribute television channels, on-demand programming, programming information, and/or other content/services to users. Television service provider system 310 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 320 (320-1, 320-2) may be used to transmit a feed of one or more television channels from television service provider system 310 to one or more satellites 330. While a single television service provider system 310 and satellite transmitter equipment 320 are illustrated as part of satellite television distribution system 300, it should be understood that multiple instances of transmitter equipment may be used, possibly scattered geographically, to communicate with satellites 330. Such multiple instances of satellite transmitting equipment 320 may communicate with the same or with different satellites 330. Different television channels may be transmitted to satellites 330 from different instances of transmitting equipment 320. For instance, a different satellite dish of satellite transmitter equipment 320 may be used for communication with satellites 330 in different orbital slots.

Satellites 330 may be configured to receive signals, such as streams of television channels, from one or more satellite uplinks such as satellite transmitter equipment 320. Satellites 330 may relay received signals from satellite transmitter equipment 320 (and/or other satellite transmitter equipment) to multiple instances of user equipment via transponder streams. Different frequencies may be used for uplink signals 370 from transponder streams 380. Satellites 330 may be in geosynchronous orbit. Each of the transponder streams transmitted by satellites 330 may contain multiple television channels transmitted as packetized data. For example, a single transponder stream may be a serial digital packet stream containing multiple television channels. Therefore, packets for multiple television channels may be interspersed.

Multiple satellites 330 may be used to relay television channels from television service provider system 310 to satellite dish 340. Different television channels may be carried using different satellites 330. Different television channels may also be carried using different transponders of the same satellite 330; thus, such television channels may be transmitted at different frequencies and/or different frequency ranges. As an example, a first and second television channel may be relayed via a first transponder of satellite 330-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 340 may be a piece of user equipment that is used to receive transponder streams from one or more satellites, such as satellites 330. Satellite dish 340 may be provided to a subscriber for use on a subscription basis to receive television channels provided by the television service provider system 310, satellite transmitter equipment 320, and/or satellites 330. Satellite dish 340, which may include one or more low noise blocks (LNBs), may be configured to receive transponder streams from multiple satellites and/or multiple transponders of the same satellite. Satellite dish 340 may be configured to receive television channels via transponder streams on multiple frequencies. Based on the characteristics of television receiver 350 and/or satellite dish 340, it may only be possible to capture transponder streams from a limited number of transponders concurrently. For example, a tuner of television receiver 350 may only be able to tune to a single transponder stream from a transponder of a single satellite at a given time. The tuner can then be re-tuned to another transponder of the same or a different satellite. A television receiver 350 having multiple tuners may allow for multiple transponder streams to be received at the same time.

In communication with satellite dish 340 may be one or more television receivers. Television receivers may be configured to decode signals received from satellites 330 via satellite dish 340 for output and presentation via a display device, such as display device 360. A television receiver may be incorporated as part of a television or may be part of a separate device, commonly referred to as a set-top box (STB). Television receiver 350 may decode signals received via satellite dish 340 and provide an output to display device 360. A television receiver is defined to include set-top boxes (STBs) and also circuitry having similar functionality that may be incorporated with another device. For instance, circuitry similar to that of a television receiver may be incorporated as part of a television, and/or such circuitry can be implemented in multiple appliances. While FIG. 3 illustrates an embodiment of television receiver 350 as separate from display device 360, it should be understood that, in other embodiments, similar functions may be performed by a television receiver integrated with display device 360.

As shown, the television receiver 350 can be implemented as one or more appliances 352. For example, the television receiver 350 can include a STB and an over-the-top (OTT) appliance, a master STB in communication with distributed slave STBs (e.g., in communication via the LAN 355, or via a separate local network enabled by the STB), etc. Though not shown, some implementations of the television receiver 350 include a modem, or the like. For example, the illustrated satellite network can be used to provide both televisions services and other communications services, such as Internet services. In such implementations, the network 390 can be implemented by the satellite communications network. For example, the output of the modem can be coupled (e.g., via a splitter) to both television receiver 350 components (e.g., a STB) and the LAN router 355. In some embodiments, one or more television receivers 350 includes some or all components of the location-tracked media delivery system 105.

Display device 360 may be used to present video and/or audio decoded and output by television receiver 350. Television receiver 350 may also output a display of one or more interfaces to display device 360, such as an electronic programming guide (EPG). In many embodiments, display device 360 is a television. Display device 360 may also be a monitor, computer, or some other device configured to display video and, possibly, play audio.

Uplink signal 370-1 represents a signal between satellite transmitter equipment 320 and satellite 330-1. Uplink signal 370-2 represents a signal between satellite transmitter equipment 320 and satellite 330-2. Each of uplink signals 370 may contain streams of one or more different television channels. For example, uplink signal 370-1 may contain a first group of television channels, while uplink signal 370-2 contains a second group of television channels. Each of these television channels may be scrambled such that unauthorized persons are prevented from accessing the television channels.

Transponder stream 380-1 represents a transponder stream signal between satellite 330-1 and satellite dish 340. Transponder stream 380-2 represents a transponder stream signal between satellite 330-2 and satellite dish 340. Each of transponder streams 380 may contain one or more different television channels, which may be at least partially scrambled. For example, transponder stream 380-1 may be a first transponder stream containing a first group of television channels, while transponder stream 380-2 may be a second transponder stream containing a different group of television channels. When a television channel is received as part of a transponder stream and is decoded and output to display device 360 (rather than first storing the television channel to a storage medium as part of DVR functionality then later outputting the television channel from the storage medium), the television channel may be considered to be viewed "live."

FIG. 3 illustrates transponder stream 380-1 and transponder stream 380-2 being received by satellite dish 340 and distributed to television receiver 350. For a first group of television channels, satellite dish 340 may receive transponder stream 380-1 and for a second group of channels, transponder stream 380-2 may be received. Television receiver 350 may decode the received transponder streams. As such, depending on which television channels are desired to be presented or stored, various transponder streams from various satellites may be received, descrambled, and decoded by television receiver 350.

Network 390 may serve as a secondary communication channel between television service provider system 310 and television receiver 350. However, in many instances, television receiver 350 may be disconnected from network 390 (for reasons such as because television receiver 350 is not configured to connect to network 390 or a subscriber does not desire or cannot connect to network 390). As such, the connection between network 390 and television receiver 350 is represented by a dotted line. Via such a secondary communication channel, bidirectional exchange of data may occur. As such, data may be transmitted to television service provider system 310 from television receiver 350 via network 390. Data may also be transmitted from television service provider system 310 to television receiver 350 via network 390. Network 390 may be the Internet. While audio and video services may be provided to television receiver 350 via satellites 330, feedback from television receiver 350 to television service provider system 310 may be transmitted via network 390.

Figure 4:
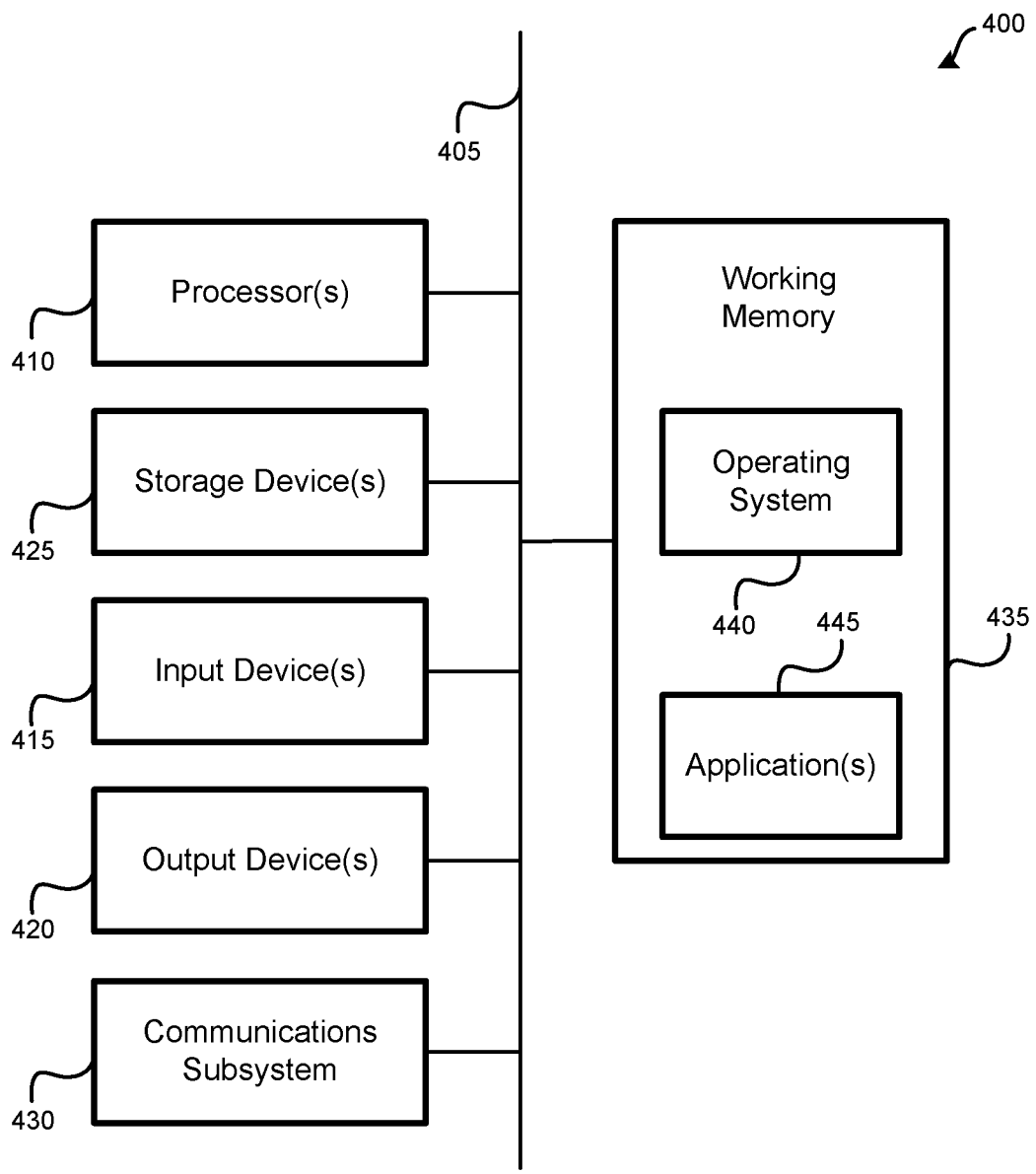
FIG. 4 provides a schematic illustration of one embodiment of a computer system that can perform various steps of the methods provided by various embodiments.

Embodiments of the location-tracked media delivery system 105, or components thereof, can be implemented on, and/or can incorporate, one or more computer systems, as illustrated in FIG. 4. FIG. 4 provides a schematic illustration of one embodiment of a computer system 400 that can perform various steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, and/or the like; and one or more output devices 420, which can include, without limitation, a display device, a printer, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 400 can also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. The communications subsystem 430 may permit data to be exchanged with a network (such as the network described below, to name one example), other computer systems, and/or any other devices described herein. In many embodiments, the computer system 400 will further comprise a working memory 435, which can include a RAM or ROM device, as described above.

The computer system 400 also can comprise software elements, shown as currently being located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes can be stored on a non-transitory computer-readable storage medium, such as the non-transitory storage device(s) 425 described above. In some cases, the storage medium can be incorporated within a computer system, such as computer system 400. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 400 and/or can take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which can be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 can cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media can be involved in providing instructions/code to processor(s) 410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 400.

The communications subsystem 430 (and/or components thereof) generally will receive signals, and the bus 405 then can carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
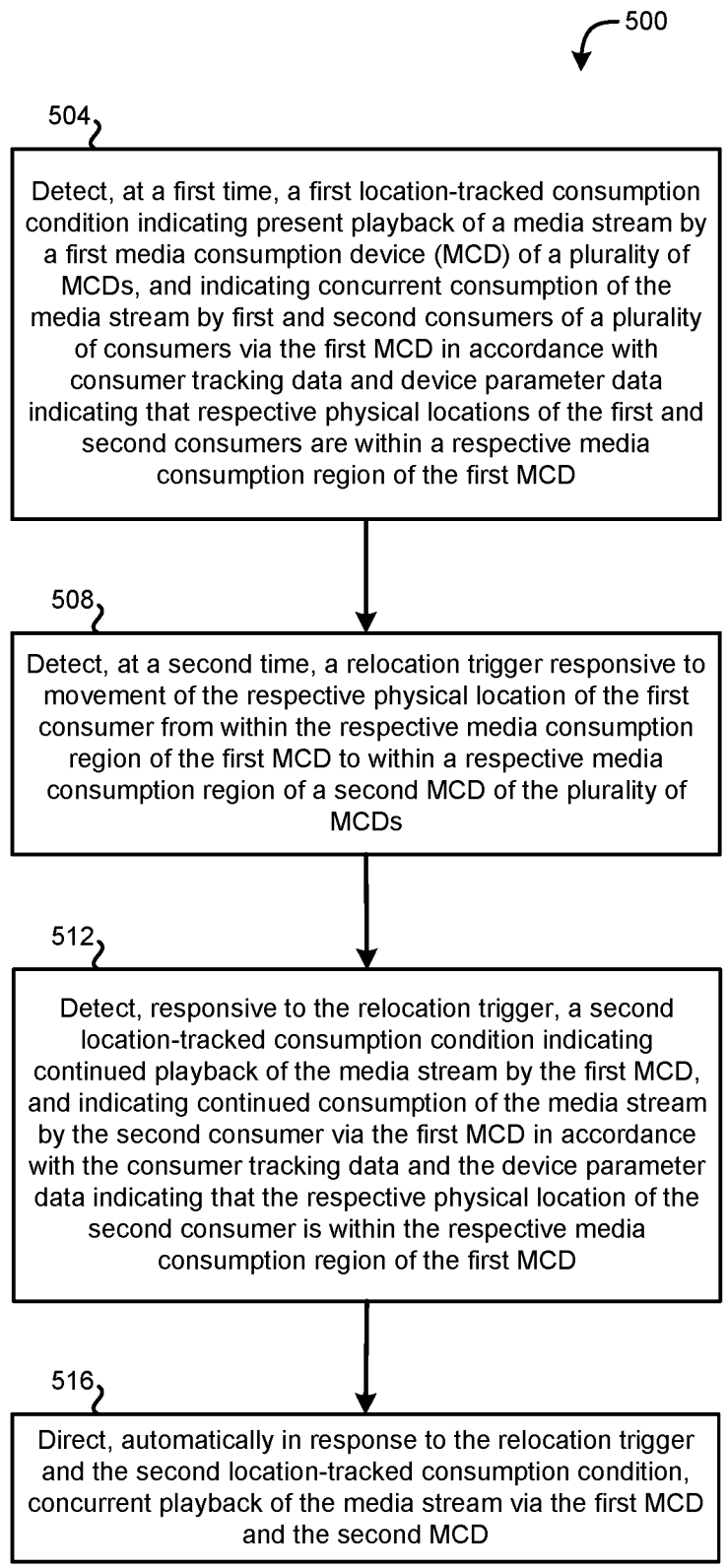
FIG. 5 shows a flow diagram of an illustrative method for location-tracked media delivery, according to various embodiments.

Systems including those described above can be used to implement various methods 500. FIG. 5 shows a flow diagram of an illustrative method 500 for location-tracked media delivery, according to various embodiments. Embodiments begin at stage 504 by detecting, at a first time, a first location-tracked consumption condition indicating present playback of a media stream by a first media consumption device (MCD) of a plurality of MCDs, and indicating concurrent consumption of the media stream by first and second consumers of a plurality of consumers via the first MCD in accordance with consumer tracking data and device parameter data indicating that respective physical locations of the first and second consumers are within a respective media consumption region of the first MCD. At stage 508, embodiments can detect, at a second time, a relocation trigger responsive to movement of the respective physical location of the first consumer from within the respective media consumption region of the first MCD to within a respective media consumption region of a second MCD of the plurality of MCDs. At stage 512, embodiments can detect, responsive to the relocation trigger, a second location-tracked consumption condition indicating continued playback of the media stream by the first MCD, and indicating continued consumption of the media stream by the second consumer via the first MCD in accordance with the consumer tracking data and the device parameter data indicating that the respective physical location of the second consumer is within the respective media consumption region of the first MCD. At stage 516, embodiments can direct automatically in response to the relocation trigger and the second location-tracked consumption condition, concurrent playback of the media stream via the first MCD and the second MCD.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed:

1. A system comprising:
   one or more processors; and
   a memory communicatively coupled with and readable by the one or more processors and having stored therein processor-readable instructions which, when executed by the one or more processors, cause the one or more processors to perform operations comprising:
      detecting, at a first time, a first consumption condition indicating present playback of a media stream by a first media device and indicating a plurality of individuals within a media consumption region of the first media device;
      detecting, at a subsequent time, a relocation trigger responsive to at least one individual of the plurality of individuals with respect to the media consumption region of the first media device, where the subsequent time is subsequent to the first time;
      detecting movement of the at least one individual with respect to a dead space region, where the dead space region is not within the media consumption region and is not within a second consumption region of a second device;
      determining whether at least one other individual of the plurality of individuals remains within the media consumption region; and
      based at least in part on the determining whether at least one other individual remains within the media consumption region, adaptively adjusting operational settings of the first media device and/or a second media device to facilitate continued consumption of the media stream in the dead space region at least partially by:
         determining a first set of one or more automatic adjustments to facilitate the continued consumption of the media stream via the first media device and/or the second media device; and
         directing, automatically in response to the relocation trigger, the first media device and/or the second media device to operate in accordance with the first set of one or more automatic adjustments to facilitate continued consumption of the media stream while the at least one individual is detected as being located within the dead space region.

2. The system as recited in claim 1, where the detecting the relocation trigger responsive to the at least one individual with respect to the media consumption region of the first media device corresponds to the at least one individual exiting the media consumption region.

3. The system as recited in claim 1, where the detecting the movement of the at least one individual with respect to the dead space region comprises detecting the at least one individual approaching the dead space region.

4. The system as recited in claim 1, the operations further comprising:
   detecting additional movement of the at least one individual with respect to the dead space region; and
   directing, automatically in response to the detecting the additional movement, the first media device and/or the second media device to operate in accordance with a second set of one or more automatic adjustments.

5. The system as recited in claim 4, where the detecting the additional movement of the at least one individual with respect to the dead space region corresponds to detecting the at least one individual exiting the dead space region.

6. The system as recited in claim 5, where the detecting the additional movement of the at least one individual with respect to the dead space region corresponds to detecting the at least one individual nearing the media consumption region or a second media consumption region.

7. The system as recited in claim 4, where the second set of one or more automatic adjustments corresponds to adaptively decreasing the operational settings of the first media device and/or the second media device made in accordance with the first set of one or more automatic adjustments.

8. The system as recited in claim 4, where the second set of one or more automatic adjustments corresponds to discontinuing the operational settings of the first media device and/or the second media device made in accordance with the first set of one or more automatic adjustments.

9. A method comprising:
   detecting, at a first time, a first consumption condition indicating present playback of a media stream by a first media device and indicating a plurality of individuals within a media consumption region of the first media device;
   detecting, at a subsequent time, a relocation trigger responsive to at least one individual of the plurality of individuals with respect to the media consumption region of the first media device, where the subsequent time is subsequent to the first time;
   detecting movement of the at least one individual with respect to a dead space region, where the dead space region is not within the media consumption region and is not within a second consumption region of a second device;
   determining whether at least one other individual of the plurality of individuals remains within the media consumption region; and
   based at least in part on the determining whether at least one other individual remains within the media consumption region, adaptively adjusting operational settings of the first media device and/or a second media device to facilitate continued consumption of the media stream in the dead space region at least partially by:
    determining a first set of one or more automatic adjustments to facilitate the continued consumption of the media stream via the first media device and/or the second media device; and
    directing, automatically in response to the relocation trigger, the first media device and/or the second media device to operate in accordance with the first set of one or more automatic adjustments to facilitate continued consumption of the media stream while the at least one individual is detected as being located within the dead space region.

10. The method as recited in claim 9, where the detecting the relocation trigger responsive to the at least one individual with respect to the media consumption region of the first media device corresponds to the at least one individual exiting the media consumption region.

11. The method as recited in claim 9, where the detecting the movement of the at least one individual with respect to the dead space region comprises detecting the at least one individual approaching the dead space region.

12. The method as recited in claim 9, further comprising:
    detecting additional movement of the at least one individual with respect to the dead space region; and
    directing, automatically in response to the detecting the additional movement, the first media device and/or the second media device to operate in accordance with a second set of one or more automatic adjustments.

13. The method as recited in claim 12, where the detecting the additional movement of the at least one individual with respect to the dead space region corresponds to detecting the at least one individual exiting the dead space region.

14. The method as recited in claim 13, where the detecting the additional movement of the at least one individual with respect to the dead space region corresponds to detecting the at least one individual nearing the media consumption region or a second media consumption region.

15. The method as recited in claim 12, where the second set of one or more automatic adjustments corresponds to adaptively decreasing the operational settings of the first media device and/or the second media device made in accordance with the first set of one or more automatic adjustments.

16. The method as recited in claim 12, where the second set of one or more automatic adjustments corresponds to discontinuing the operational settings of the first media device and/or the second media device made in accordance with the first set of one or more automatic adjustments.

17. One or more non-transitory, machine-readable media having machine-readable instructions thereon which, when executed by one or more processing devices, cause the one or more processing devices to perform operations comprising:
    detecting, at a first time, a first consumption condition indicating present playback of a media stream by a first media device and indicating a plurality of individuals within a media consumption region of the first media device;
    detecting, at a subsequent time, a relocation trigger responsive to responsive to at least one individual of the plurality of individuals with respect to the media consumption region of the first media device, where the subsequent time is subsequent to the first time;
    detecting movement of the at least one individual with respect to a dead space region, where the dead space region is not within the media consumption region and is not within a second consumption region of a second device;
        determining whether at least one other individual of the plurality of individuals remains within the media consumption region; and
    based at least in part on the determining whether at least one other individual remains within the media consumption region, adaptively adjusting operational settings of the first media device and/or a second media device to facilitate continued consumption of the media stream in the dead space region at least partially by:
        determining a first set of one or more automatic adjustments to facilitate the continued consumption of the media stream via the first media device and/or the second media device; and
        directing, automatically in response to the relocation trigger, the first media device and/or the second media device to operate in accordance with the first set of one or more automatic adjustments to facilitate continued consumption of the media stream while the at least one individual is detected as being located within the dead space region.

18. The one or more non-transitory, machine-readable media as recited in claim 17, where the detecting the relocation trigger responsive to the at least one individual with respect to the media consumption region of the first media device corresponds to the at least one individual exiting the media consumption region.

19. The one or more non-transitory, machine-readable media as recited in claim 18, where the detecting the movement of the at least one individual with respect to the dead space region comprises detecting the at least one individual approaching the dead space region.

20. The one or more non-transitory, machine-readable media as recited in claim 19, the operations further comprising:
    detecting additional movement of the at least one individual with respect to the dead space region; and
    directing, automatically in response to the detecting the additional movement, the first media device and/or the second media device to operate in accordance with a second set of one or more automatic adjustments.

* * * * *